Jan. 23, 1968　　　HIROSHI IIDA ETAL　　　3,365,641
ELECTRIC MOTOR SPEED CONTROL DEVICE
Filed Jan. 21, 1965
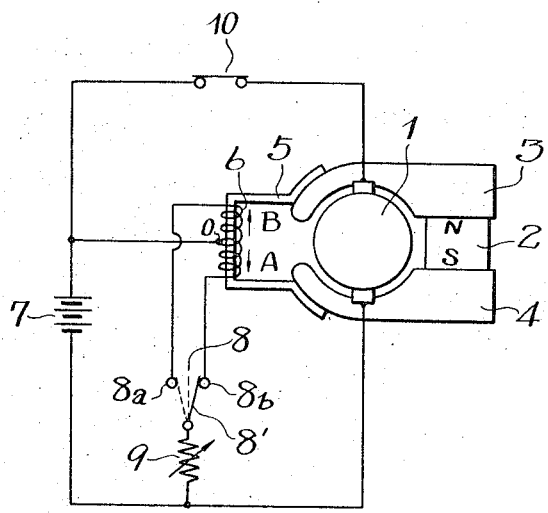
INVENTORS
HIROSHI IIDA AND
KEITARO KANADA
BY
*Linton and Linton*
ATTORNEYS

United States Patent Office 3,365,641
Patented Jan. 23, 1968

3,365,641
ELECTRIC MOTOR SPEED CONTROL DEVICE
Hiroshi Iida, Kariya-shi, and Keitaro Kanada, Toyohashi-shi, Japan, assignors of fifty percent to Nippon Denso Kabushiki Kaisha, Kariya-shi, and fifty percent to Mannoo Kogyo Kabushiki Kaisha, Anjo-shi, Japan, both corporations of Japan
Filed Jan. 21, 1965, Ser. No. 426,849
Claims priority, application Japan, Feb. 23, 1964, 39/54,930
1 Claim. (Cl. 318—355)

ABSTRACT OF THE DISCLOSURE

The present invention relates to a device for selectively manually changing the speed of an electric motor of the type used for windshield wipers. The motor has a principal permanent magnet field, upon which is superposed a magnetic field produced by an electro-magnet. The direction of the current through the winding of the electromagnet may be manually varied, by a switch, and thereby the motor field and its speed are varied.

---

The present invention relates to a speed control device for the purpose of effectively wiping the window of an automobile by changing the speed of the motor employed in the window wiper in accordance with the amount of rainfall.

Hitherto, the speed control of a motor which is employed in this kind of device using an electro-magnet in the magnetic field employed in this kind of device has been carried out by controlling the terminal voltage with a resistance inserted into the armature circuit, and this is possessed of drawbacks in that power loss is great and speed fluctuation due to the change of load torque is also great.

The present invention is directed, in order to eliminate the aforementioned drawbacks, to the achievement of motor speed control by providing an auxiliary electromagnet pole piece so as to bridge across the ends of the respective pole piece of the motor for a window wiper, and varying the effective magnetic flux applied to the armature by the winding wound around the said auxiliary pole piece, and thus varying the speed of the motor so as to maintain the power loss and speed fluctuation at a minimum. The direction of the current in the winding of the auxiliary electromagnet may be selectively varied by throwing a switch to change the direction of current in the winding.

The present invention will be better understood and the object and advantages hereof will become clearer through the following description of a preferred example of the embodiment of the present invention that will be illustrated in reference to the appended drawing, in which:

1 denotes an armature; 2 is a principal permanent magnet for the magnetic field, the upper pole being N and the lower, S; 3 and 4 indicate magnetic pole pieces of the magnet provided at the two ends of the magnet 2 for the magnetic field; 5 is an auxiliary U-shaped pole piece for bridging the ends of magnetic pole pieces 3 and 4; 6 represents an auxiliary winding wound around the base of said auxiliary pole piece 5, the central point O of the said winding 6 being connected to the positive pole of a storage battery 7; the two ends of the winding 6 being connected to the contacts 8a and 8b of a single pole manually operable changeover switch 8 for the purpose of changing the winding current direction and thereby the direction of the magnetomotive force, respectively; the blade 8' of the changeover switch 8 is connected with the negative pole of the storage battery 7 through a variable resistance 9 that controls the current flowing in the winding 6; in addition, one end of the winding of said armature 1 has been connected with the positive pole of the storage battery 7 through a main switch 10, the other end of this winding being connected with the negative pole of the storage battery 7.

The operation in such a system as aforementioned will be further described as follows:

The main power-source switch 10 is closed and the winding of armature 1 is energized and the armature 1 rotates. Now, when the blade 8' of the switch 8 is manually brought into contact with the contact 8b, a current flows in the circuit from the positive pole of the storage battery 7, the central point O of the winding 6, the lower half of the winding 6, the contact 8b, the blade 8', the resistance 9 to the negative pole of the storage battery 7, so that a magnetomotive force in the direction of the lower arrow A is generated; the effective magnetic flux between the magnetic poles 3 and 4 decreases; and the speed of rotation of the armature 1 increases. Subsequently, when the blade 8' of the switch 8 is brought into contact with the contact 8a, a current flows in the circuit from the positive pole of the storage battery 7, the central point O of the winding 6, the upper half of the winding 6, the contact 8a, the blade 8', the reesistance 9, and the storage battery 7, so that a magnetomotive force in the direction of upper arrow B is generated; the effective magnetic flux between the two magnetic poles 3 and 4 increases; and the speed of rotation of the armature 1 decreases. In this case, it is possible to freely vary and increase or decrease the speed of rotation by controlling the current flowing in the auxiliary coil 6 upon adjustment of the resistance values of the variable resistance 9.

According to the foregoing description, the device of the present invention can achieve speed control by providing an auxiliary pole which is wound around with an auxiliary winding so as to bridge between the different magnetic poles of the motor, and thus adjusting the main magnetic flux, so that, compared to the method of inserting a resistance into the armature circuit, the effect hereof is important since speed fluctuation on account of power loss and load is extremely small, and control to a large extent is possible.

What is claimed is:

1. In a speed control device for a window wiper electric motor, a rotor, a bar permanent magnet adjacent said rotor, a pair of pole pieces attached to said permanent magnet and having arcuate surfaces to surround a substantial part of the periphery of said rotor and leaving a gap between the ends of said pole pieces remote from said permanent magnet, an auxiliary U-shaped permanent magnet member of magnetic material having terminal shoes magnetically engaging the free ends of the arcuate surfaces of said two pole pieces respectively, an actuating winding wound on the base of said auxiliary U-shaped magnet member of magnetic material, said actuating winding having a center tap, a source of direct current voltage, having one terminal connected to said center tap, and a single pole double throw switch having its blade connected to the other terminal of said source and having its two contacts connected to the respective ends of said actuating winding for selectively causing current to flow in either direction through said winding.

References Cited

UNITED STATES PATENTS 2,474,830   7/1949   Curry _____ 318—355 X

ORIS L. RADER, *Primary Examiner.*
J. J. BAKER, *Assistant Examiner.*